Patented May 6, 1941

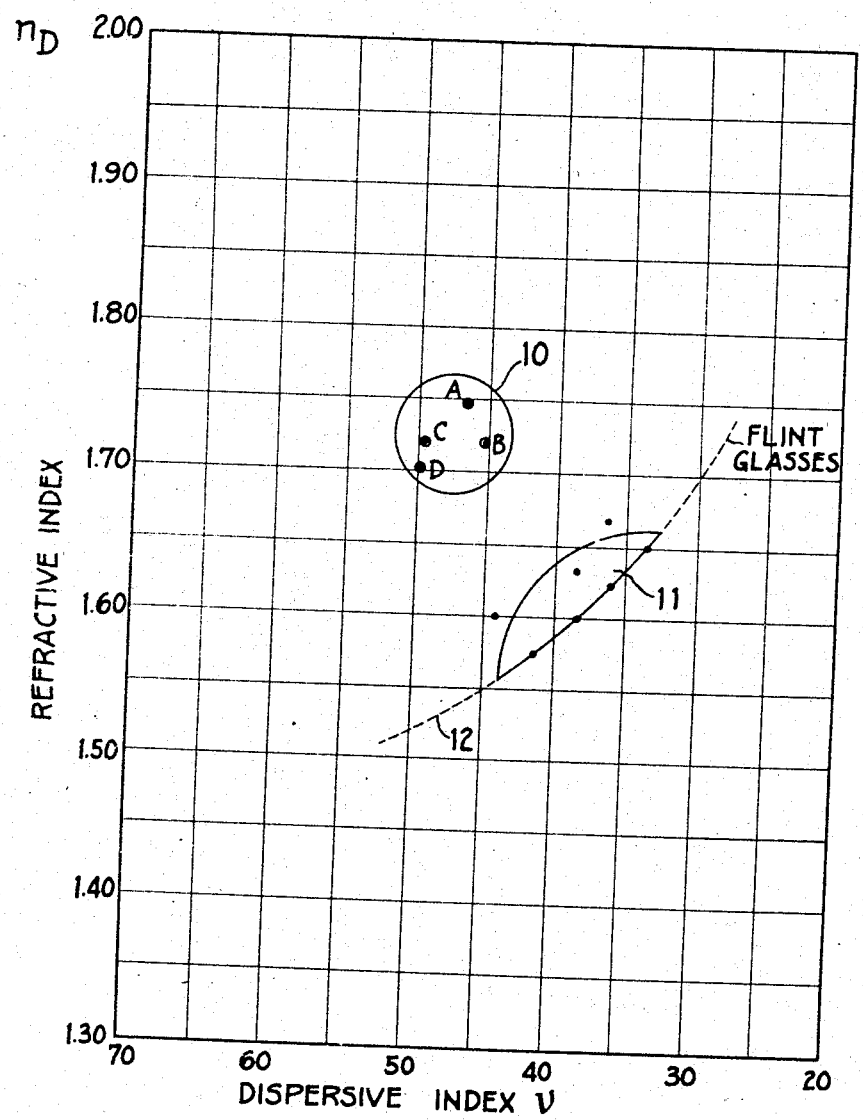

2,241,249

UNITED STATES PATENT OFFICE 2,241,249

OPTICAL GLASS

Leon W. Eberlin and Paul F. De Paolis, Rochester, N. Y., assignors to Eastman Kodak Company, Rochester, N. Y., a corporation of New Jersey Application July 12, 1939, Serial No. 284,041

4 Claims. (Cl. 106—36.1)

This invention relates to optical glass and particularly to high index crown glass of the type generally covered by Dr. George W. Morey in his U. S. Patent 2,150,694, granted March 14, 1939.

It is an object of the present invention to provide an optical glass which is and will be particularly useful in highly corrected optical systems such as photographic lenses.

In lens design, the correction of chromatic aberration, while simultaneously maintaining good correction of the other aberrations, requires that glasses be selected having certain interrelationships between their refractive indices and their dispersions. Generally speaking, each flint glass element should be accompanied by a crown glass element and for the best results the crown glass should have both its refractive and dispersive indices higher than those of the flint glass. Furthermore, it is desirable that the difference between the indices of the two glasses should be fairly large. As is well known, there are many exceptions to this general rule and in some cases glasses with the same refraction but different dispersions or with the same dispersion and different refractions are quite useful.

The pair or pairs of glasses selected by the lens designer is sometimes used in adjacent cemented elements, sometimes the two glasses are separated by an air space, sometimes the pair of elements is used along with other pairs of glasses and in some cases one of the elements is separated into two or more parts. For example, one flint glass element may be accompanied by two or more crown glass elements of the same or of similar glasses. The ordinary air spaced triplet wherein a negative element is spaced between two positive elements is a well-known example of such an arrangement.

The terms "crown" and "flint" are here employed merely by way of example since such arrangements are common but in some cases two crown glasses are used. In any case, the difference in the indices is the important factor and any two glasses having suitable relationships between their indices may be used.

It happens that there are readily available, a very large number of fine optical glasses having a refractive index of about 1.60 and a dispersive index around 40. Ordinary flint glasses are in this region. From the standpoint of the designer of high quality lenses, these glasses would be most useful when employed along with a glass having a refractive index of about 1.72 and a dispersive index of 47.

It is the primary object of the present invention to provide a glass having these indices of refraction and dispersion, and which, in the preferred form, is clear, hard, and able to withstand weathering. A further object of one embodiment of the invention to provide a glass composition which is easy to flux, is not liable to devitrify and which when annealed uniformly, reliably forms a glass of uniform optical properties.

According to the invention such a glass can be produced by fusion from a batch of metallic oxides including between 15 and 35% lanthanum oxide, between 5 and 15% thorium oxide, between 28 and 37% boric oxide, between 10 and 20% of tantalum oxide or tungsten oxide and between 5 and 25% of barium oxide. The barium oxide can be wholly or partly replaced by calcium, strontium or magnesium oxide. For example, a glass made up of about 30% to 35% boric oxide, about 25% lanthanum oxide, about 10% thorium oxide, about 15% of either tantalum or tungsten oxide and about 15% of barium, calcium, strontium or magnesium oxide will form a glass having the desired optical properties. Furthermore, such a glass will be commercially useful, since it is clear, hard, easy to flux, does not devitrify, and is able to withstand the weather. In some cases we have found it desirable to add a small quantity of sodium, potassium, or lithium oxide to secure easier fluxing, but in general, this is not necessary. Similarly, aluminum oxide may be added to aid in maintaining vitrification, and a small amount of beryllium may be added to make the glass more weather-proof, but even without these added materials, satisfactory and extremely useful glasses are obtained.

The accompanying drawing is a graph of refractive index (measured for the D line of the spectrum) plotted against the dispersive index $\mu$. Each optical glass may be represented by a point on this chart.

As is well known, flint glasses all lie more or less on a curve illustrated by the broken line 12 in this chart of the indices. The dense flint glasses are of higher refractive index and lower dispersive index, whereas the light flint glasses have lower refractive index and higher dispersive index. A high dispersive index indicates lower dispersion power. A light flint glass and a dense flint glass cannot in general be used for achromatizing optical systems because in the flint glass series higher refractive power is always accompanied by higher dispersing power (lower dispersive index).

Ordinary crown glasses lie above this curve 12 and to the left of it, centered generally about an index of refraction of 1.55 and a dispersive index of about 58. There are available on the market and listed in the catalogs of all optical glass manufacturers a very large number of glasses, many of them flint glasses, lying in the region marked 11 on this chart. A few typical glasses are indicated by points in or near this area 11. From an optical standpoint, such glasses can be used most effectively for the correction of aberrations, when employed along with a glass having a refractive index of about 1.72 and a dispersive index of about 47. It is, of course, quite difficult to describe exactly how much a glass may vary from this stated value and still be extremely useful, but in general the area can be represented by a circle such as that labeled 10 on the chart. This circle includes glasses between 1.70 and 1.75 for the index of refraction and between 45 and 50 for the dispersive index. Glasses slightly outside of this circle could also be used, possibly with equally satisfactory results, but any great variation from this area would be less desirable from the point of view of the optical designer.

The following examples have indices within this area 10 as indicated. The composition and optical properties of these examples are as follows:

|  | Example | | | |
| --- | --- | --- | --- | --- |
|  | A | B | C | D |
|  | Percent | Percent | Percent | Percent |
| Lanthanum oxide | 28 | 28 | 24 | 20 |
| Tantalum oxide | 18 |  | 15 | 12 |
| Tungsten oxide |  | 18 |  |  |
| Thorium oxide | 12 | 12 |  | 12 |
| Barium oxide | 12 | 12 | 9 | 20 |
| Strontium oxide |  |  | 10 |  |
| Boric oxide | 30 | 30 | 32 | 36 |
| Refractive index | 1.745 | 1.725 | 1.720 | 1.702 |
| Dispersive index | 47 | 45 | 49 | 50 |

We have found that the boric oxide content can be varied from about 28% to about 37% without carrying the indices far from the region 10. Similarly, the lanthanum oxide can be varied between 15 and 35%; the thorium oxide between 5 and 15%; the tantalum or tungsten oxide can be varied between 10 and 20% and the barium oxide between 5 and 25%. The use of tungsten rather than tantalum apparently gives a much easier working glass during the melting and casting operations. On the other hand, the tantalum provides a higher refraction index and a higher dispersive index. The oxides of calcium, strontium and magnesium can largely replace the barium in each of these samples and still produce a commercially satisfactory glass within the area 10.

Although it is not primarily important to the present invention, we have found that small quantities of sodium, potassium or lithium oxide sometimes apparently help to secure easier fluxing. Also, aluminum and beryllium oxides in small quantities have some beneficial effects, but even without these, the resulting glasses are highly useful.

The general idea of making glasses including lanthanum, tantalum, thorium and boric oxides is, of course, not new. Also it is common practice to include barium oxide in a glass although not specifically with tantalum oxide. However, the above glasses are superior to any previously produced, particularly from the optical design standpoint such as when used with ordinary flint glasses. The invention is not limited to the specific compositions listed, but is of the scope of the appended claims.

What we claim and desire to secure by Letters Patent of the United States is:

1. A glass having an index of refraction for the D line about 1.72 and a dispersive index about 47 and resulting fusion of a batch containing between 15 and 35% of lanthanum oxide, between 5 and 15% thorium oxide, between 28 and 37% boric oxide, between 10 and 20% of oxides from the group consisting of tantalum oxide and tungsten oxide and between 5 and 25% of oxides from the group consisting of barium, calcium, strontium, and magnesium oxides.

2. A glass resulting from fusion of a batch according to claim 1 which batch also includes a small amount of beryllium oxide.

3. A glass containing about 28% lanthanum oxide, about 18% of an oxide selected from the group consisting of tantalum oxide and tungsten oxide, about 12% thorium oxide, about 12% barium oxide and about 30% boric oxide.

4. A glass having an index of refraction for the D line between 1.70 and 1.75 and a dispersive index between 45 and 50 comprising about 30% boric oxide, about 25% lanthanum oxide, about 10% thorium oxide, about 15% of the oxides from the group consisting of tantalum oxide and tungsten oxide, and about 12% of oxides from the group consisting of barium, calcium, strontium, and magnesium oxides.

LEON W. EBERLIN.
PAUL F. DE PAOLIS.